J. R. PRICE.
APPARATUS FOR STARTING INTERNAL COMBUSTION ENGINES.
APPLICATION FILED SEPT. 6, 1912.

1,243,875.

Patented Oct. 23, 1917.
6 SHEETS—SHEET 1.

WITNESSES:

INVENTOR.
BY
ATTORNEY.

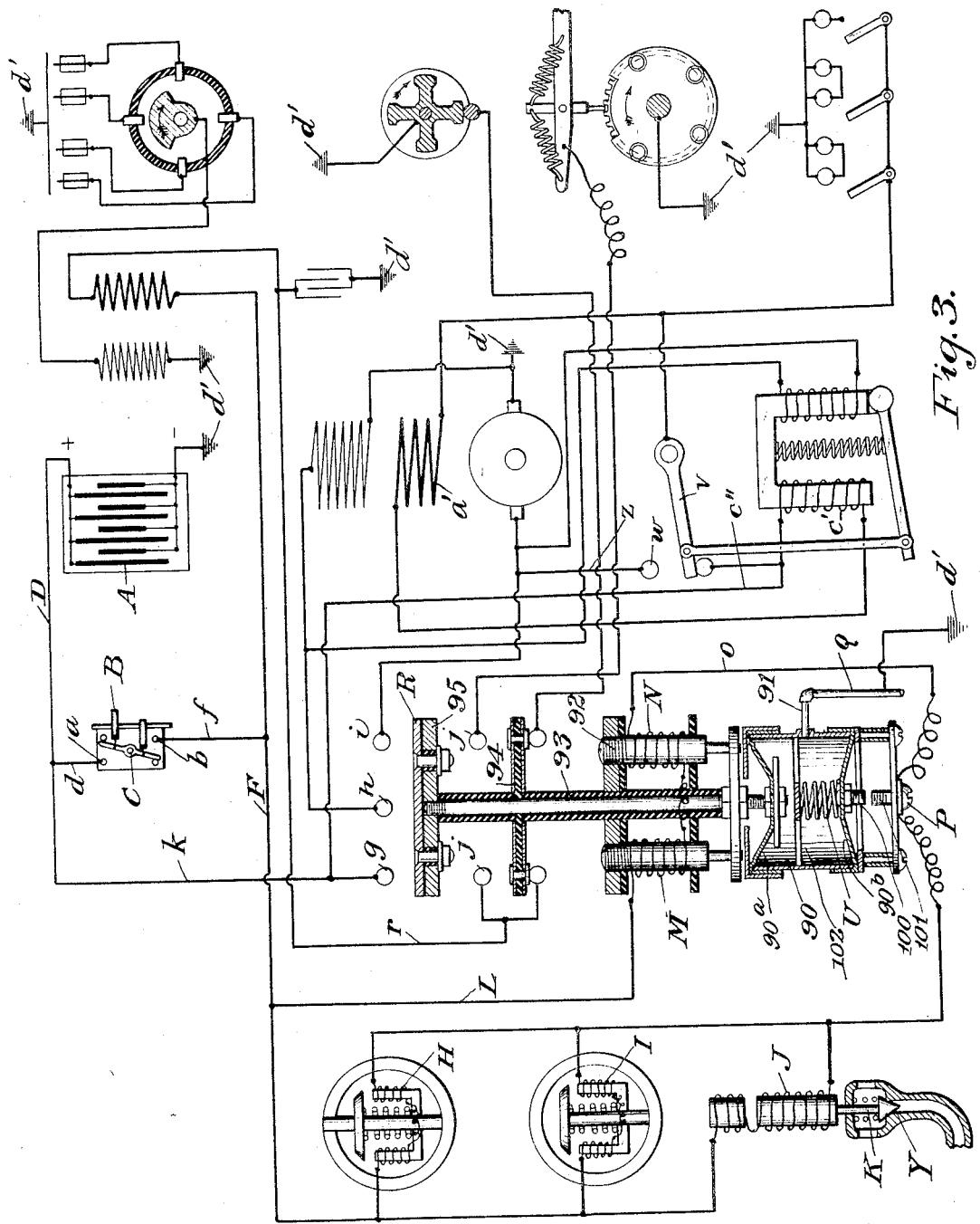

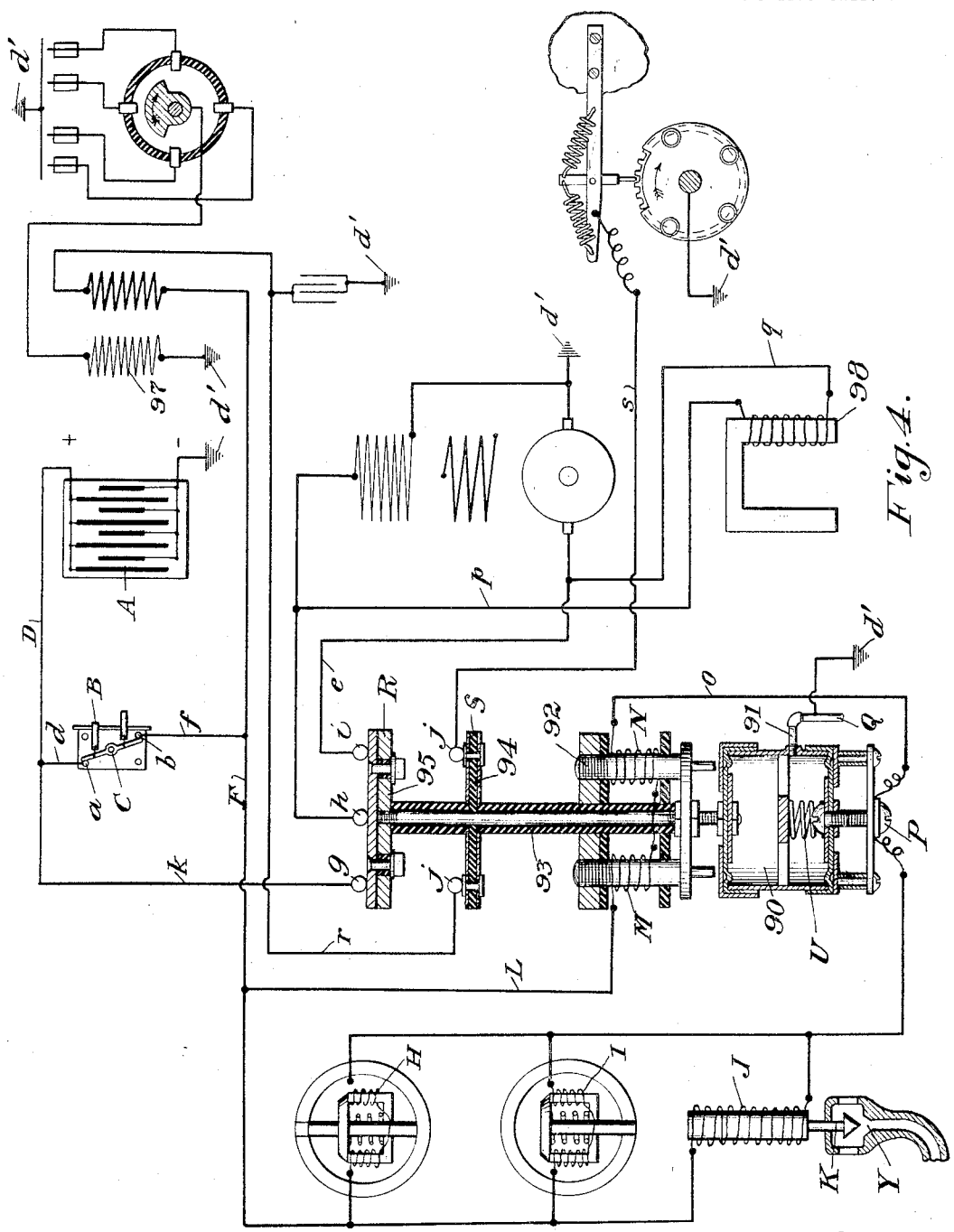

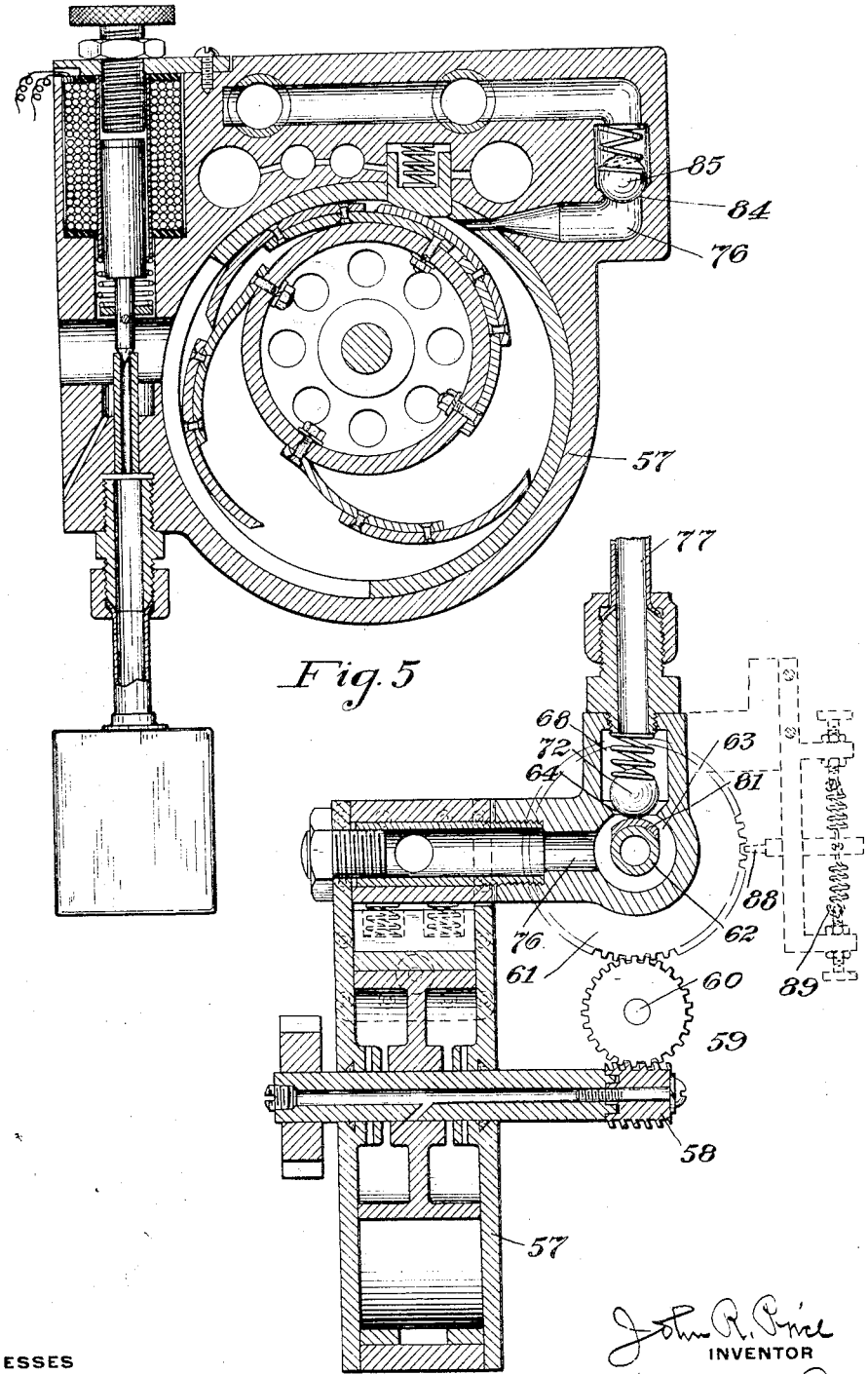

J. R. PRICE.
APPARATUS FOR STARTING INTERNAL COMBUSTION ENGINES.
APPLICATION FILED SEPT. 6, 1912.

1,243,875.

Patented Oct. 23, 1917.
6 SHEETS—SHEET 6.

UNITED STATES PATENT OFFICE.

JOHN R. PRICE, OF WILKINSBURG, PENNSYLVANIA, ASSIGNOR TO PRICE ELECTRIC DEVICES CORPORATION, OF BASIC CITY, VIRGINIA, A CORPORATION OF VIRGINIA.

APPARATUS FOR STARTING INTERNAL-COMBUSTION ENGINES.

1,243,875.   Specification of Letters Patent.   Patented Oct. 23, 1917.

Application filed September 6, 1912. Serial No. 718,872.

*To all whom it may concern:*

Be it known that I, JOHN R. PRICE, a citizen of the United States, residing at Wilkinsburg, in the county of Allegheny and State of Pennsylvania, have invented a new and useful Improvement in Apparatus for Starting Internal-Combustion Engines, of which improvement the following is a specification.

My invention relates to improvements in methods of starting internal combustion engines and in control mechanism therefor.

The object of the invention is to produce, first, means for automatically generating a current or stream of explosive compound independent of the usual means for producing an explosive mixture; second, means for distributing and regulating the distribution of the said explosive compound current to the engine; third, means for igniting the compound for starting the engine; fourth, means for restoring electrical energy to battery.

Heretofore, so far as I am aware, it has been usual to start an internal combustion engine by mechanically cranking, or by utilizing electric mechanical energy directly, or by utilizing a gas prepared and stored on the machine for use when needed. The purpose of my invention is to avoid the difficulties incident to these various ways of starting the engine and simplify the construction. I accomplish these objects by means of a stream or current of explosive mixture produced and distributed by means independent of the engine to the engine cylinders when required to start the same, and ignite said mixture therein automatically, as hereinafter more fully described, reference being had to the accompanying drawings, in which—

Fig. 3 is a diagrammatic view of the several elements or members and the electrical circuits actuating the same.

Fig. 4 is a diagrammatic view showing the position of the various electric circuits at the moment of starting the engine.

Fig. 5 is a central sectional elevation of the vaporizer blower, and the gasolene vessel and valve.

Fig. 6 is a transverse section of the same, showing also the gas distributing mechanism and vibrator.

Figure 8:
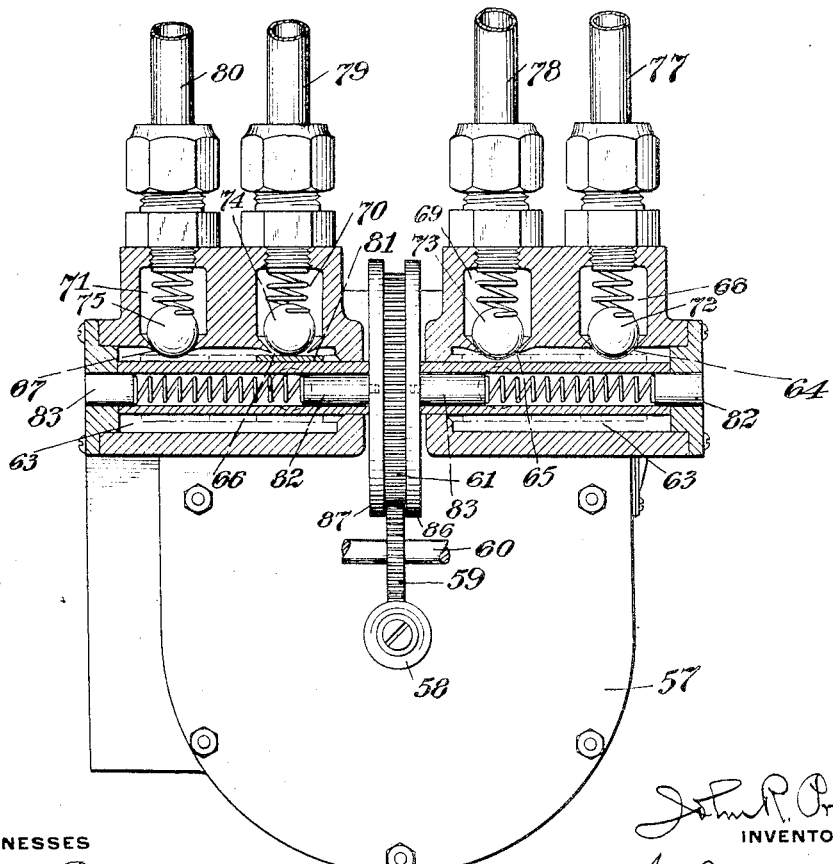
Fig. 8 is a vertical section of the same.

Referring to said drawings, 1 is the frame of an ordinary automobile or other power driven vehicle. 2 is an explosive engine of the ordinary type, comprising four cylinders, carbureter, tank and piping. 3 and 4 is a conventional representation of the usual gasolene tank and carbureter, and 5 is the case inclosing my improved starting mechanism. 6, 7, 8, 9 are electric conductors leading from binding post or posts 10 to the spark plugs 11, 12, 13, 14. 15, 16, 17 and 18 are conduits or pipes leading from the gas distributing mechanism 19 to the cylinders 20, 21, 22 and 23, respectively. 24 is a shaft projecting from one end of the case of the starting mechanism and may be provided with a pulley 25, over which and over a pulley 26 on the power shaft 27 of the engine a chain 28 operates, or other suitable driving mechanism may be used instead. The said shaft 24 has affixed thereto by means of pin 29 one member 30 of a clutch, the other member 31 of which is fixed upon the shaft 32 of the armature 33 by means of a pin 34. The said clutch member 30 is provided with an opening or orifice 35 and the member 31 is provided with a stud or projection 36, which is adapted to enter said orifice 35 and clutch and hold both members together. The hub 37 of said member 30 is provided with a pinion 38, which meshes with and communicates motion to a gear 39, mounted on a short shaft 40, and this gear meshes with a gear 41 on the shaft 42, on which is mounted the low tension electric distributer 43 and high tension electric distributer 44. The end of armature shaft 32 opposite to that on which clutch member 31 is secured is connected to shaft 45 by means of a pin 46, or in any suitable manner. The said shaft 45 has mounted thereon a clutch member 47, which is secured to said shaft by means of a pin 48. The said member 47 is provided with a projection 49, which is adapted to engage in an orifice 50, in the clutch member 51, on the outer end of said shaft 47, whereby the two clutch members are secured together for the purpose of enabling the same to rotate with said shaft. The said clutch member 51 is provided with, on the periphery thereof, a series of teeth 52 adapted to mesh with and communicate motion to a gear 53 on shaft 54, which in turn meshes with and transmits motion to the gear 55 mounted on shaft 56, on which the vaporizer blower 57 is mounted. The outer end of said shaft 56 is provided with a worm 58, which meshes with a pinion 59 mounted on a short shaft 60. The said pinion meshes with and transmits motion to the gas distributing gear 61, which is mounted on and transmits motion to valve shaft 62, seated in the chambers 63. In the upper wall of said chambers are formed ports 64, 65, 66, 67, which communicate with, respectively, chambers 68, 69 70 and 71, in which, respectively, are seated the spring pressed ball valves 72, 73, 74 and 75, which respectively control said ports 64, 65, 66 and 67 for the purpose of admitting explosive compound from the vaporizer blower 57 through the conduit 76 to the pipes 77, 78, 79 and 80, through which said compound is transmitted to the respective cylinders. The said shaft 62 is provided with a number of protuberances 81, corresponding in number with the ball valves and ports, and are for the purpose of raising said ball valves from their seats in successive order as said shaft is rotated for the purpose of permitting the passage of the gas through the ports as shown in Fig. 8. The said shaft comprises a thimble the ends of which are made gas tight by the spring pressed plugs 82, 83. The port 84 between the vaporizer blower and the chambers 63 is controlled by a check valve 85, which while it admits the passage of explosive mixture through said port 84 to the cylinders of the engine is so constructed as to prevent the possibility of explosive gases passing backward toward the blower. The said gear 61 is inclosed between two disks 86, 87, the edges thereof extending beyond the edge of the gear as shown in Fig. 8, and a portion of their peripheries, about one-fourth, cut out, so that while the teeth of said gear 61 are in constant mesh with pinion 59, the said teeth contact with the finger 88 of the vibrator 89 only when the cut out portion of the disks are opposite said finger. The finger contacts with and travels on the edge of the disks, which are made of a material which is an electric non conductor, and serves when it engages the teeth of the gear 61 to make and break the circuit of the primary coils of the ignition system, the high tension current from the secondary coils passing through a timer to the spark plugs to explode the mixture in the respective cylinders at the proper intervals of time. 90 is the shell of a pressure operated switch, which is connected to the intake of the engine by means of the pipe 91. The shell 90 is closed at the top thereof by a diaphragm $90^a$ and at the bottom thereof by a diaphragm $90^b$. The upper diaphragm $90^a$ is connected to the lower end of the post or head 93, while the lower diaphragm $90^b$ carries a contact 100 which is adapted to engage a fixed contact 101 on the terminal P. A spring U is interposed between a spider 102 in the shell 90 and the lower diaphragm $90^b$, so as to hold the contact 100 in engagement with the contact 101 when the engine is not running and there is not a partial vacuum within the shell 90. The terminal P is then grounded at $d'$ through the spring U, spider 102 and pipe 91. The circuit is then closed through the clutch magnets H and I, the magnet J of the fuel supply valve K, and the coils M and N of the magnet 92. As soon as the engine starts, the partial vacuum produced within the intake manifold is transmitted through the pipe 91 to the shell 90 of the pressure operated switch, thereby flexing the diaphragms $90^a$ and $90^b$ inwardly, as indicated on Fig. 3. This lowers the post or rod 93, and also separates the contact 100 from the contact 101 so as to break the circuit through the clutch magnates H and I, as well as through the magnet J of the gasolene valve K. This pressure controlled switch thus operates to automatically cut off the auxiliary fuel supply, stop the blower, and restore the normal ignition system, as soon as the engine is started. One member of said pressure controlled switch is connected to an electrically operated control switch which comprises a magnet 92 and a rod or shaft 93, on which switch blades 94, 95 are mounted. $v$ is a reverse current switch, the function of which is to disconnect, under certain conditions, the battery A from the armature and to connect the armature and the battery A when the armature is producing sufficient voltage, whereby the battery is recharged. 97 is the spark coil, which is in circuit with the high tension electrical distributer and with the vibrator. 98 is the field of the armature. 99 are binding posts through which the electric current is carried to the spark plugs 100.

In Fig. 3 all the various elements heretofore described are diagrammatically shown, together with a battery and a number of electric circuits leading from said battery to said elements.

In Fig. 4 is shown all the elements constituting my improved starting device, showing the electric circuits controlling same, at the moment of starting the engine.

Figure 1:
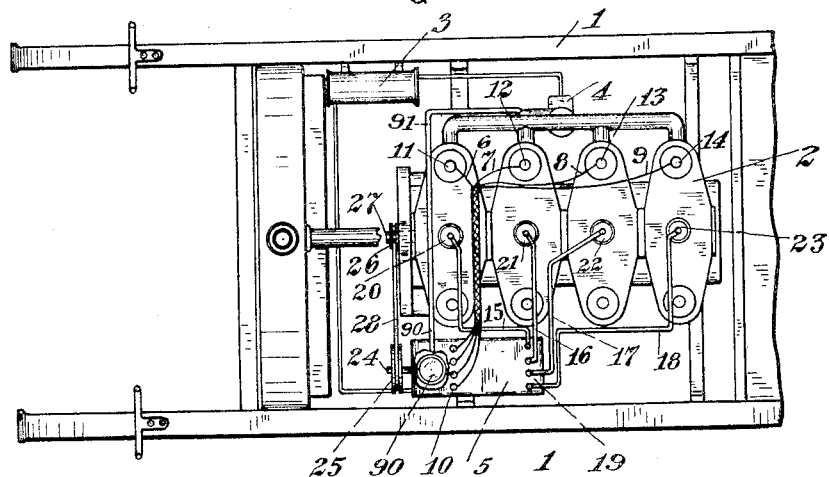
Figure 1 is a plan view of a fragmentary portion of an automobile or other power driven vehicle, showing the engine thereof and my improvement applied thereto.
Figure 2:
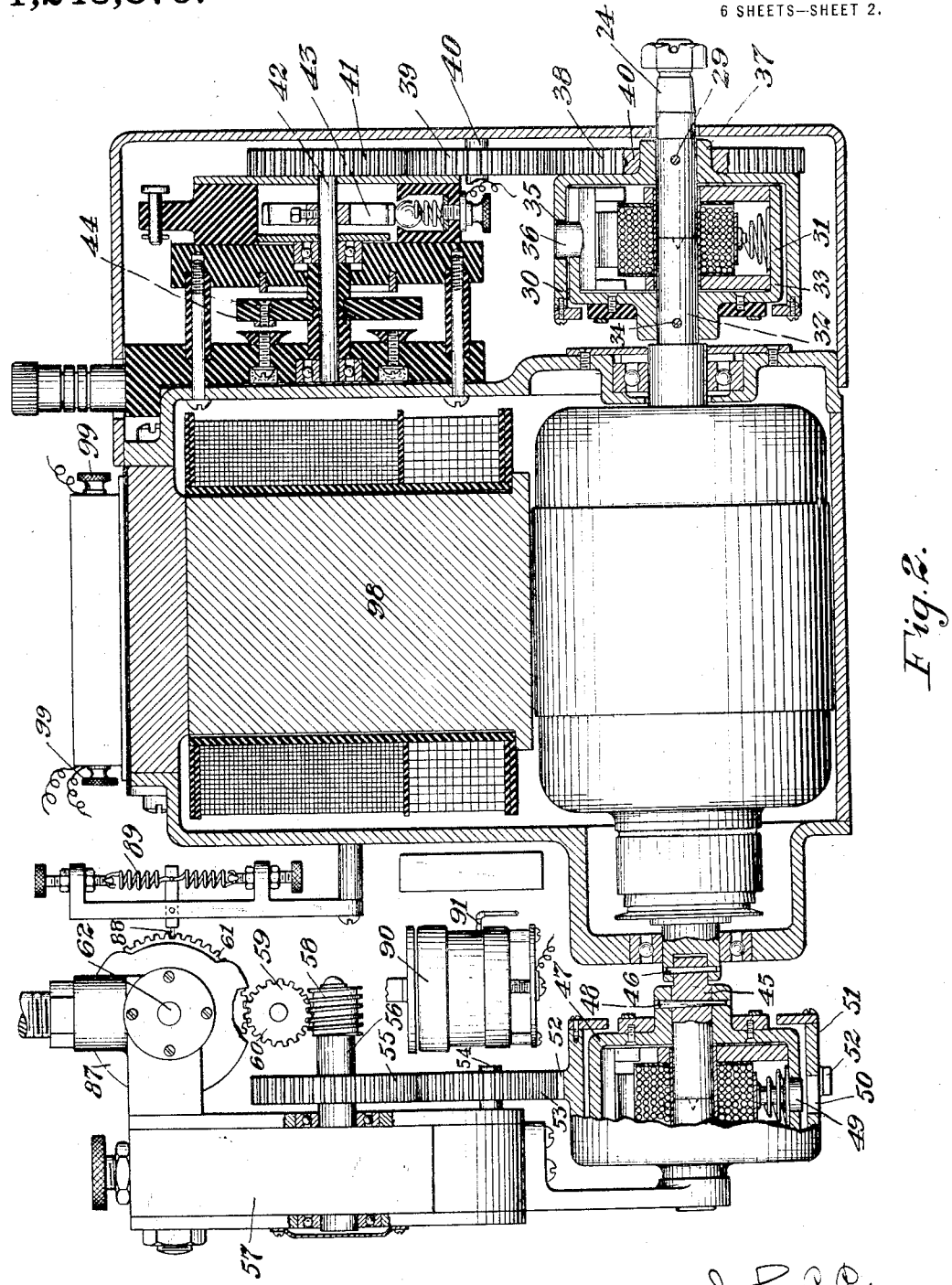
Fig. 2 is a longitudinal central view, partly in section, of my improved starting device.
Figure 7:
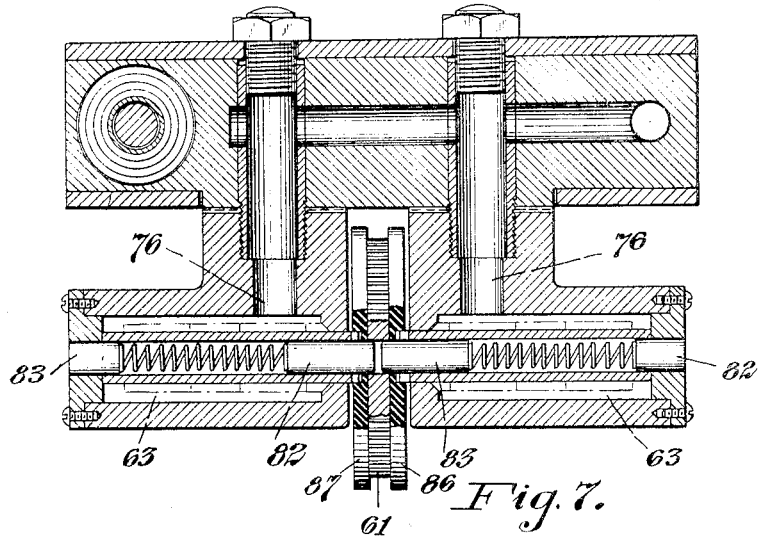
Fig. 7 is a transverse section through the gas distributing mechanism.

In said Fig. 4 A represents a battery. B is a push button. C is a switch. Upon pushing said button said switch is thrown into contact with the posts $a$, $b$, whereby current from the battery passes through conductors D, d, through switch C to conductors F, f to the coils H, I that actuate the clutch members, and to the coil J that operates the needle valve K, which controls the gasolene port Y. At the same time current passes from said battery to conductor L, to the coils M, N of the magnet 92, to conductor O, to and through the binding post P, to the pipe Q, to the ground. The electrical energy from said battery thus transmitted actuates the clutches, throwing clutch members 32 and 33 out of engagement and members 49 and 51 into engagement and instantaneously putting into operation the vaporizer blower and opening the gasolene valve. Simultaneously with this operation the electric current energizes the coils M, N of magnet 92, putting the control switch in the position shown in Fig. 4. In the position shown in said Fig. 4 the switch blades R, S contact with contacts e, g, h and i, j, respectively, transmitting electric current from battery to armature through conductor k, switch blade R, conductor 1, to armature. A portion of the current passes through conductor M, to the coil N, through conductor o to ground, while a portion passes through one leg of the shunt switch through conductors p, q to armature. The operation of the blower serves to suck or draw in the gasolene and air in proportions proper to produce the required explosive mixture, this being regulated by the valve and the size of the air admission port. At the same time the explosive mixture distributing mechanism is put in operation; whereby the mixture is fed to the cylinders of the engine. Switch blade S puts the high and low tension electric distributer in circuit through conductors r, s for the purpose of producing a spark to ignite the explosive mixture. The operation described produces or generates a stream or jet of explosive mixture from the gasolene and air formed and distributed by the vaporizer blower and ignites the same by the electric spark. Immediately the engine starts a vacuum is produced in the pressure switch 90 by means of the intake of the engine, which is connected with said valve by the pipe 91. The vacuum thus produced opposes the pull of the spring U and causes the control switch to drop into the position shown in Fig. 3, cutting out the battery from the starting mechanism and putting the clutch mechanism in the position shown in Fig. 2. In the position shown in Figs. 2 and 3 the engines are driving the vehicle, and energy from the battery is utilized to operate the vibrator and lamps, or other devices if desirable. As soon as the armature acquires normal speed it attracts arm r of the reverse current switch into contact with the contact post w, whereby, voltage of the armature being greater than that furnished by battery, the armature current is transmitted to the battery to recharge same through conductors z, reverse current switch arm r, to conductor, series field coil a', reverse current switch series coil C', conductor C'', to battery. The return conductor of the several circuits is the ground connection d'' to the frame of vehicle as shown.

Having described my invention, what I claim and desire to secure by Letters Patent is:

1. A mechanism for starting internal combustion engines including an engine with its cylinders, fuel supply and intake mechanism, a vaporizer blower, a fuel supply pipe leading to the vaporizer blower, a valve for the said fuel supply pipe, means for simultaneously opening the said valve and actuating the vaporizer blower, means for distributing the combustible material from the vaporizer blower to the engine cylinders, and ignition means.

2. A mechanism for starting internal combustion engines including an engine with its cylinders, fuel supply and intake mechanism, a vaporizer blower, a fuel supply pipe leading to the vaporizer blower, a valve for the fuel supply pipe, valve controlled means for distributing the combustible mixture from the vaporizer blower to the cylinders of the engine in proper sequence, ignition means, and means actuated by the pressure in the intake for automatically stopping the vaporizer blower when the engine is started.

3. A mechanism for starting internal combustion engines including an engine with its cylinders, fuel supply and intake mechanisms, a vaporizer blower, a fuel supply pipe leading to the vaporizer blower, a valve for the fuel supply pipe, means for simultaneously opening the valve and starting the vaporizer blower, valve controlled distributing means for supplying the combustible mixture from the vaporizer blower to the cylinders of the engine in proper sequence, ignition means, and means actuated by the pressure in the intake of the engine for automatically stopping the vaporizer blower after the engine is started.

4. A mechanism for starting internal combustion engines including an engine with its cylinders, fuel supply and intake mechanism, a vaporizer blower, a fuel supply pipe leading to the vaporizer blower, an electrically controlled valve for the fuel supply pipe, electrically operated means for driving the vaporizer blower, means for simultaneously starting the vaporizer blower and opening the valve of the fuel supply pipe, distributing means leading from the vaporizer blower to the engine cylinders, ignition means, and an electric switch controlled by the pressure in the engine intake for automatically stopping the vaporizer blower and closing the valve of the fuel supply pipe after the engine has started.

5. A mechanism for starting internal combustion engines including an engine with its cylinders, fuel supply and intake mechanism, an electric battery, an electric armature with its field, electrical connections between said battery and said armature and field, a vaporizer blower, adapted to be driven by the armature, a fuel supply pipe leading to the vaporizer blower, a valve for said fuel supply pipe, distributing means for leading the combustible mixture from the vaporizer blower to the engine cylinders, an electric switch for starting the armature, means for simultaneously opening the valve, means operated by the battery to produce an electric spark, and an automatic switch for stopping the vaporizer blower and placing the armature in circuit with the battery to recharge the same after the engine has started.

6. A mechanism for starting internal combustion engines including an engine with its cylinders, fuel supply and intake, an electric battery, an electric armature with its field, electrical connections between said battery and said armature and field, a vaporizer blower adapted to be driven by the armature, a fuel supply pipe leading to the vaporizer blower, an electrically controlled valve for the fuel supply pipe, a switch for simultaneously starting the vaporizer blower and opening the valve of the fuel supply pipe, mixture distributing means leading from the vaporizer blower to the engine cylinders, means operated by the battery to produce an electric spark, and switch means actuated automatically by the pressure in the intake for stopping the vaporizer blower and putting the armature into circuit with the battery to recharge the latter after the engine has started.

7. A mechanism for starting internal combustion engines including an engine with its cylinders, fuel supply and intake, an electric battery, an electric armature with its field, electrical connections between said battery and said armature and field, a vaporizer blower, a clutch controlled driving connection between the armature and the vaporizer blower, a fuel supply pipe leading to the vaporizer blower, a valve for the fuel supply pipe, means for simultaneously opening the valve of the fuel supply pipe, starting the armature and closing the clutch of the driving connection between the armature and the vaporizer blower, distributing means between the vaporizer blower and the engine cylinders, means operated by the battery to produce an electric spark, and an automatic switch for opening the clutch of the driving connection between the armature and the vaporizer blower and placing said armature in circuit with the battery so as to recharge the latter after the engine has started.

8. A mechanism for starting internal combustion engines, including an engine with its cylinders, fuel supply and intake, an electric battery, an electric armature with its field, electrical connections between said battery and said armature and field, a vaporizer blower, a driving connection between the armature and the vaporizer blower, an electric clutch controlling the driving connection, a fuel supply pipe leading to the vaporizer blower, an electrically controlled valve for the fuel supply pipe, distributing means leading from the vaporizer blower to the engine cylinders, a switch for simultaneously driving the armature, closing the clutch and opening the valve, sparking means operated by the battery, and an automatic switch actuated by the pressure in the engine intake for opening the clutch and placing the armature into circuit with the battery so as to recharge the latter after the engine has started.

9. In mechanism for starting internal combustion engines, the combination of the engine cylinders, a tank containing vaporizing fluid, a valve controlling the flow of vaporizing fluid from the tank, a vaporizer blower connected with said cylinders and with the atmosphere and said gasolene tank, means to simultaneously operate said blower and to open the valve of the gasolene tank, and means to explode the mixture transmitted by said vaporizer blower in said cylinders.

10. In mechanism for starting internal combustion engines, the combination of an electric battery, an electric armature with its field, electrical connections between said battery and said armature and field, a tank containing vaporizing fluid, a valve controlling the discharge of vaporizing fluid therefrom, a vaporizer blower, electro mechanical connections between the battery and said blower and valve whereby the said blower may be operated simultaneously with the opening of said valve, and means operated by said battery to produce an electric spark.

11. In mechanism for starting explosive engines, the combination of an electric battery, an electric armature with its field, electrical connections between said battery and said armature and field, a tank containing vaporizing fluid, a valve controlling the discharge of vaporizing fluid therefrom, a vaporizer blower, electro mechanical connections between the battery and said blower and valve whereby the said blower may be operated simultaneously with the opening of said valve, means operated by said battery to produce an electric spark, and a switch adapted to cut off the power supply to the vaporizer blower, mixture distributing apparatus and gasolene valve, and put said armature into circuit with said battery for the purpose of recharging the same.

12. In an internal combustion engine, the combination of a source of electrical energy, means operated by said energy to produce an explosive mixture and distribute the same to the cylinders of said engine, means to ignite said explosive mixture in the cylinders, and an automatic switch adapted to disconnect the source of electric energy from the means to produce and distribute the explosive mixture and the means to ignite the same.

13. In mechanism for starting explosive engines, the combination of an electric battery, an electric armature with its field, electrical connections between said battery and said armature and field, a tank containing vaporizing fluid, a valve controlling the discharge of vaporizing fluid therefrom, a vaporizer blower, electrical actuating means between the battery and said blower and valve whereby the said blower may be operated simultaneously with the opening of said valve, means operated by said battery to produce an electric spark, and an automatic switch adapted to cut off the electrical actuating means of the vaporizer blower, mixture distributing apparatus and gasolene valve, and put said armature into circuit with said battery for the purpose of recharging the same.

14. A mechanism for starting internal combustion engines including an engine, an electric battery, an electric armature with its field, an armature shaft, electrical connections between said battery and said armature and field, a vaporizer blower, a clutch controlled driving connection between the armature shaft and the vaporizer blower, a fuel supply pipe leading to the vaporizer blower, distributing means leading from the vaporizer blower to the engine cylinder, an electric distributer, a clutch controlled driving connection between the driving shaft and the electric distributer, switch controlled means for closing the clutch of the first mentioned driving mechanism and opening the clutch of the second mentioned driving mechanism when starting the engine, and automatic means for reversing the position of the clutches and placing said armature into circuit with the battery for the purpose of recharging the latter after the engine has been started.

15. The combination of a gas engine having an intake pipe and a vacuum controlled switch in communication with said intake pipe for controlling an electric circuit.

16. A gas engine having an intake pipe and a vacuum controlled switch connected to the intake pipe and actuated by the variations of pressure between the intake pipe and the atmosphere for the purpose of controlling an electric circuit.

17. The combination with an internal combustion engine with its cylinders, fuel supply and intake mechanism, of an independent source of fuel supply, selective means for charging the fuel into the engine cylinders in proper sequence, ignition means, and means for automatically cutting off the independent supply of fuel when the engine starts.

18. The combination of an internal combustion engine having an intake pipe, auxiliary means for starting the engine, and means actuated by the variations of pressure between the intake pipe and the atmosphere for automatically cutting off the auxiliary starting means after the engine has started.

19. The combination of an internal combustion engine, auxiliary fuel supply means, auxiliary ignition current distributing means, and means for automatically cutting off the auxiliary fuel supply and restoring the normal ignition current distributing means when the engine starts.

In testimony whereof, I have hereunto signed my name in the presence of two subscribing witnesses.

JNO. R. PRICE.

In the presence of—
A. B. DALLY, Jr.,
J. W. MAHONEY.